INVENTORS
GLEASON L. GRAY
HAYDEN M. SOULE, JR.
BY *Sommer & Weber*
ATTORNEYS

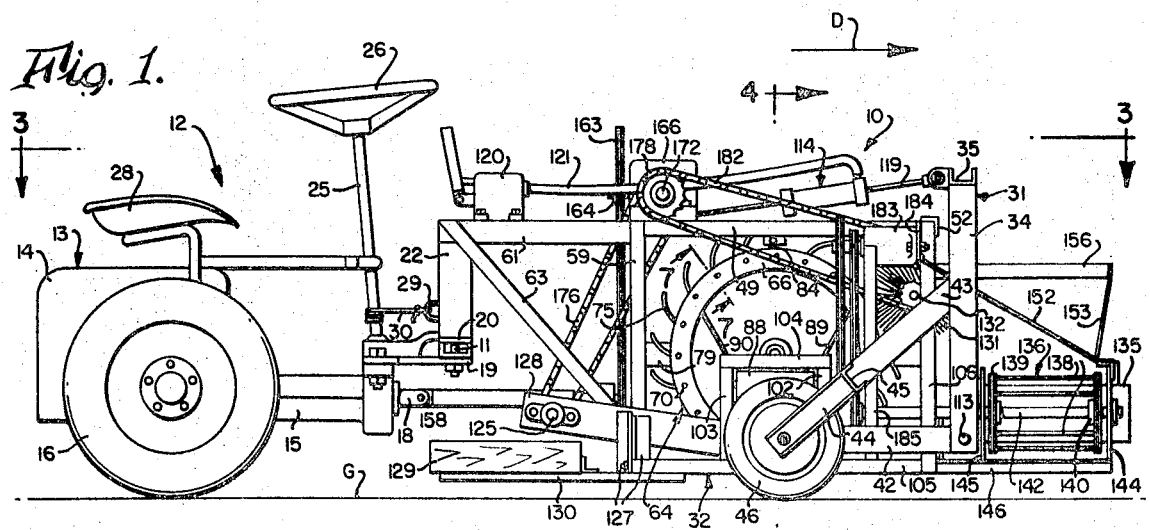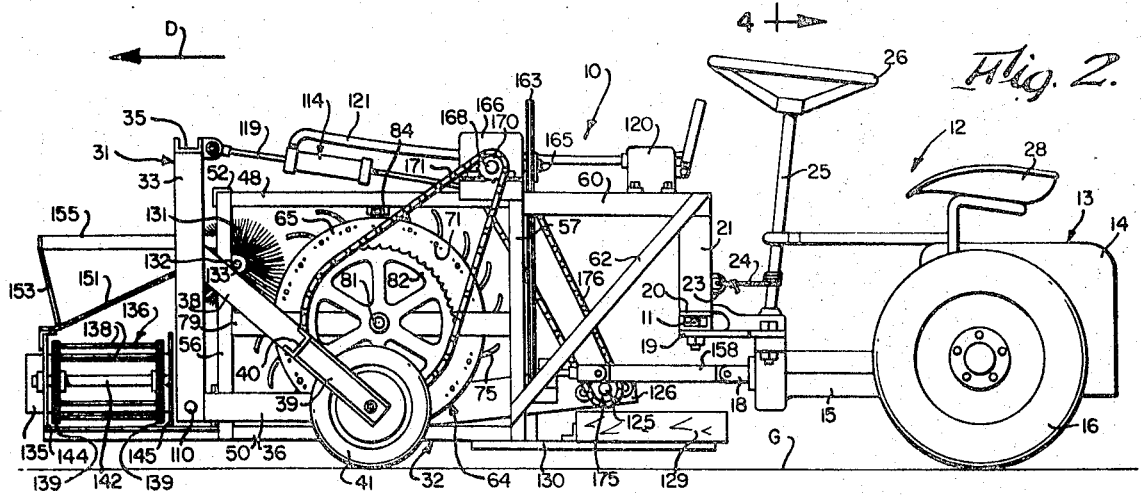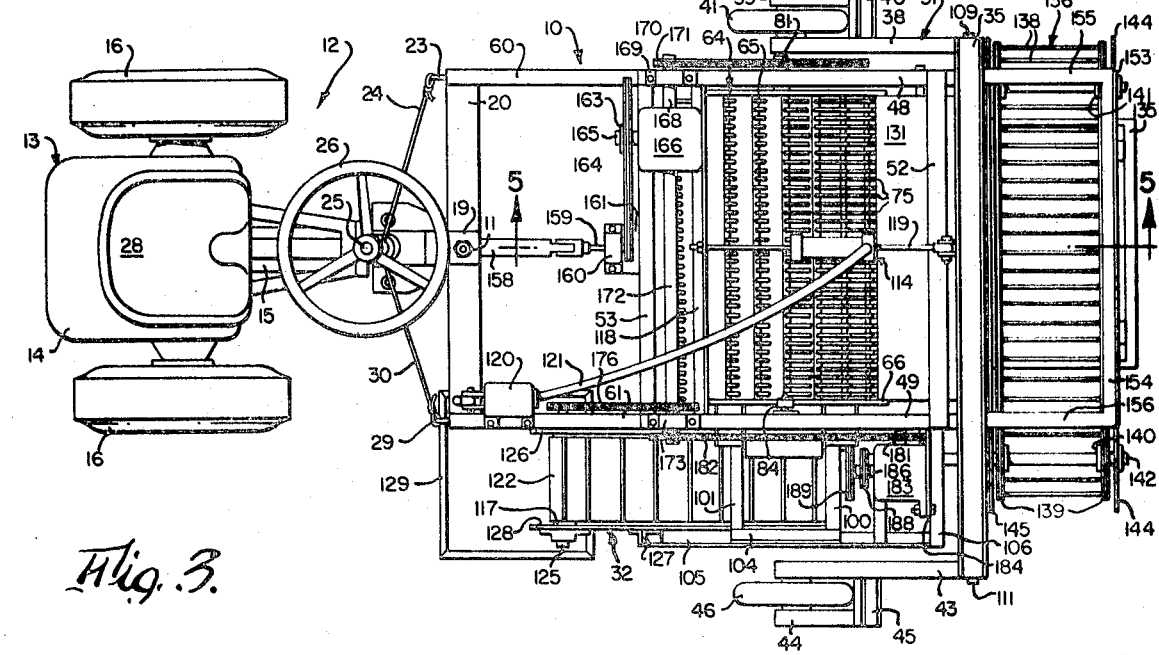

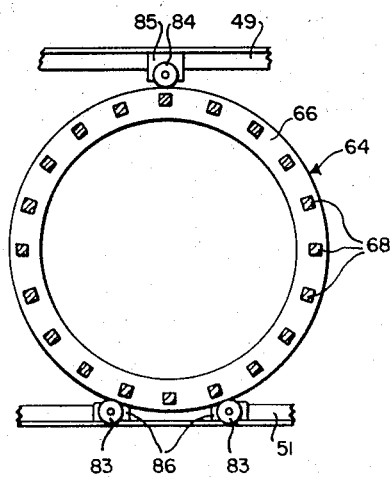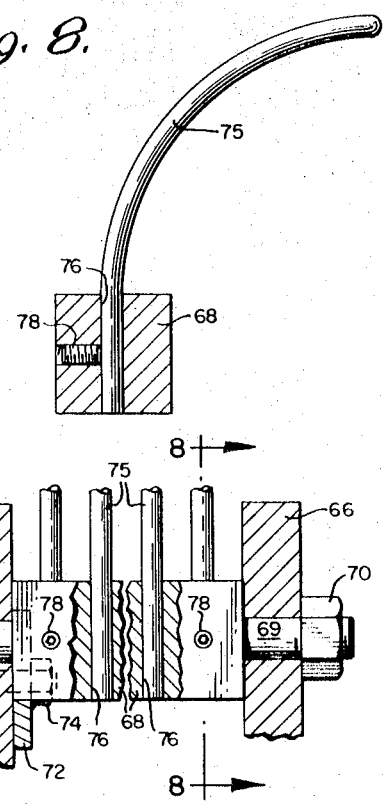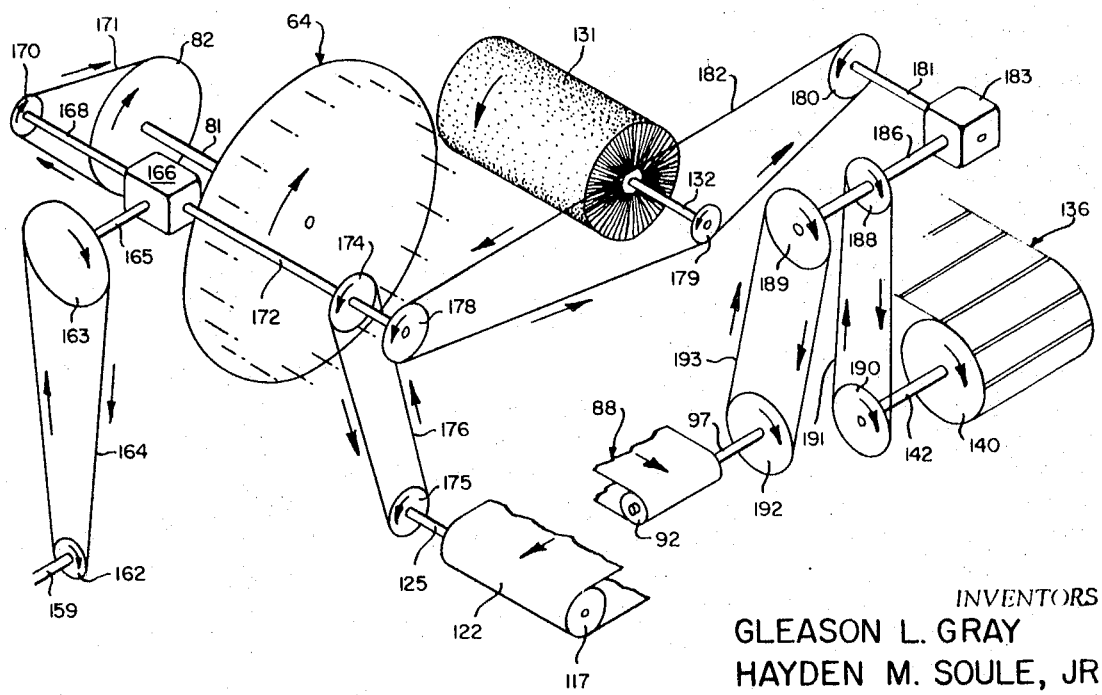

United States Patent Office 3,616,630
Patented Nov. 2, 1971

3,616,630
MACHINE FOR HARVESTING FRUIT
ON LOW PLANTS
Gleason L. Gray, Brewer, and Hayden M. Soule, Jr.,
Orono, Maine, assignors to Chisholm-Ryder Company,
Inc., Niagara Falls, N.Y.
Filed Oct. 10, 1969, Ser. No. 865,448
Int. Cl. A01g 19/00
U.S. Cl. 56—330         4 Claims

ABSTRACT OF THE DISCLOSURE

A mechanical harvester is disclosed which picks fruit from relatively low plants such as lowbush blueberries, the picker being movable over the plants and comprising rows of laterally spaced tines or teeth which descend successively into the plants and move rearwardly therethrough and thence upwardly to comb or rake the fruit from the plants, carrying the fruit upwardly and dumping it so that it can be conveyed to a suitable collection location.

BACKGROUND OF THE INVENTION

Lowbush blueberries are relatively low plants which grow wild on uncultivated land given little attention. The ground under these bushes may be rolling and hummocky, and also sometimes stones are found on the ground which contribute to the unevenness of the terrain. Sufficient acreage of lowbrush blueberries exists, particularly in the northeastern part of the United States, to make it worthwhile to harvest the berries.

Heretofore, such lowbush blueberries have been picked principally by hand, the picker swinging forwardly and upwardly away from him a hand held scoop-like tool which is a combination rake and receptacle. Not only was the rate of hand picking slow as well might be visualized but also it was inefficient since many berries were missed by the picker as well as knocked off the bushes to fall onto the ground resulting in a relatively high berry loss.

While various forms of mechanical harvesters for lowbush blueberries have been tried, none has been fully satisfactory before the advent of the present invention because lacking either maneuverability, or ability to continue in operation without break-down, or damaging the berries so as to render them of inferior quality, or possessing a combination of these deficiencies.

SUMMARY OF THE INVENTION

The present invention provides an improved mechanical harvester for relatively low plants such as lowbush blueberries which overcomes the deficiencies of the prior art harvesters and has the advantages of maneuverability over uneven terrain, minimizes damage to the fruit, is capable of remaining in operation for extended periods of time without getting out of order or requiring repairs, and is efficient in operation as to rate of berry recovery.

In accordance with the present invention, the harvester comprises a frame movable over the plants and supporting with its axis transverse to the direction of travel a rotatable hollow drum or reel the periphery of which is provided by a plurality of circumferentially spaced generally longitudinal rows of laterally spaced cantilever-mounted tines or teeth arranged to comb or rake the plants successively and remove the fruit therefrom, the drum or reel being rotated in a direction such that the leading side of the drum or reel descends as the frame travels over the plants.

Another feature is to provide such a harvester in which there is a dead point in the lower front quadrant of the drum or reel at which the rearwardly directed horizontal velocity component of the tines or teeth at such point substantially equals the forward travel speed of the harvester, thereby facilitating penetration of the foilage of the plants from above with minimum disturbance of the plants.

Another feature is to provide such a harvester in which the fruit removed by the drum or reel is mainly retained and carried to the top of the drum or reel to fall onto a conveyor arranged inside the drum or reel for delivery to a suitable collection location.

Another feature is to provide such a harvester in which the level of the tips of the picking tines or teeth is adjustable relative to the ground.

A further feature is to provide such a harvester in which provision is made for removing debris that may become lodged between the tines or teeth and thereby maintain the picking efficiency of the harvester.

Still a further feature is to provide such a harvester in which provision is made for recovering fruit which may have been entrapped in the debris following removal from between the tines or teeth.

Other advantages of the invention will be apparent from the following detailed description of a preferred embodiment illustrated in the accompanying drawings.

BRIEF DESCRIPTION OF DRAWINGS

FIG. 1 is a right side elevational view of a mechanical harvester embodying a preferred form of the present invention.

FIG. 2 is a left side elevational view thereof.

FIG. 3 is a top plan view thereof, taken on line 3—3 of FIG. 1.

FIG. 6 is a fragmentary vertical longitudinal sectional view thereof taken on line 6—6 of FIG. 4.

FIG. 7 is a greatly enlarged fragmentary sectional view of the reel taken on line 7—7 of FIG. 1.

FIG. 8 is a vertical sectional view thereof taken on line 8—8 of FIG. 7.

FIG. 9 is a schematic perspective of the drive mechanism for the various driven parts of the harvester.

DESCRIPTION OF THE PREFERRED EMBODIMENT

Figure 4:
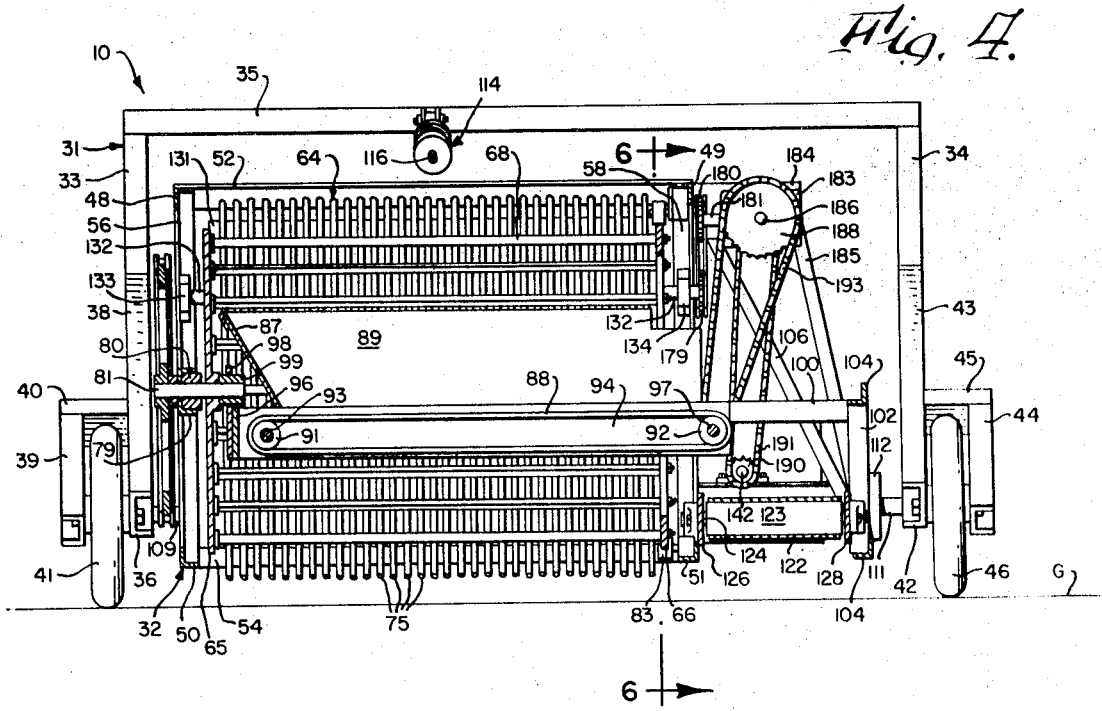
FIG. 4 is an enlarged vertical transverse sectional view thereof taken on line 4—4 of FIG. 1.

The harvester is shown as including a front machine section 10 pivotally connected by a vertical pivot pin 11 to a rear machine section 12. Rear section 12 includes a power driven tractor 13 which may be of any suitable construction and is shown as including an engine 14 associated with a transmission 15 suitably driving a pair of ground engaging wheels 16 and having a front power takeoff shaft 18. The tractor includes a forwardly extending rigid yoke 19 which embraces the central portion of the transverse horizontal hollow rectangular frame member 20. Pivot pin 11 extends through registered holes provided in this member and the upper and lower arms of the yoke.

At opposite ends of this frame member 20 and suitably rigidly connected thereto are left and right vertical angle bar frame members 21 and 22, respectively. The frame members 20–22 form part of front machine section 10. Left vertical frame member has secured on its rear side a left eye 23 to which one end of a cable 24 is suitably connected. The opposite end of this cable wraps around a steering column 25 carried by the tractor and on the upper end of which is a steering wheel 26 which may be manipulated by the operator when occupying a seat 28 arranged over engine 14. Right vertical frame member 22 also has a similar eye 29 on its rear side to which one end of another cable 30 is suitably secured, the opposite end of which is wrapped around steering column 25. Thus by rotating the steering wheel, one cable is unwound while the other is wound about the steering column and in this manner the front machine section 10, being articulated to rear section 11, can be steered as the harvester is self-propelled over the ground G in the direction of travel represented by the arrow D shown in FIGS. 1 and 2.

Front machine section 10 is shown as including a wheeled main frame 31 and a subframe 32 adjustably mounted on this main frame. The main frame includes left and right vertical channel bars 33 and 34, respectively, connected at their upper ends rigidly by a transverse horizontal channel bar 35. A left horizontal channel bar 36 extends rearwardly from the lower end of left vertical bar 33, and is rigidly secured thereto. An inclined left channel bar brace 38 extends downwardly and rearwardly from the intermediate portion of left vertical bar 33 and is rigidly secured thereto, and at its lower end this brace is suitably rigidly connected to the rear end of left horizontal bar 36. This left brace 38 has a parallel short channel bar counterpart 39 spaced outwardly therefrom and rigidly connected at its upper end thereto by a cross channel bar 40. To the lower ends of these inner and outer braces 38 and 39 and arranged therebetween is suitably journalled a left wheel 41.

A similar construction is on the right side of the machine. Thus there is a lower horizontal channel bar 42 rigidly connected to and extending rearwardly from the lower end of right vertical bar 34 and a right inner angle bar brace 43 rigidly connected to and extending downwardly from the intermediate portion of bar 34 and connected at its lower end rigidly to the rear end of bar 42. An outer short channel bar brace 44 paralleling inner brace 43 is rigidly connected thereto at its upper end by a cross channel bar 45. Arranged between inner and outer braces 43 and 44 and journalled thereon is a right ground engaging wheel 46 coaxially disposed relative to left wheel 41.

Arranged between horizontal bars 36 and 42 of main frame 31 is the subframe 32 which is a box-like structure including left and right upper horizontal longitudinal angle bars 48 and 49, respectively; left and right lower horizontal longitudinal angle bars 50 and 51, respectively; front and rear upper transverse angle bars 52 and 53, respectively; front and rear lower transverse angle bars 54 and 55, respectively; front and rear left vertical angle bars 56 and 57, respectively; and front and rear right vertical angle bars 58 and 59, respectively. These bars 48–59 are suitably rigidly connected at their meeting ends as by welding.

Left and right horizontal longitudinal hollow rectangular bars 60 and 61, respectively, extend rearwardly from and are suitably connected to the upper ends of left and right rear vertical bars 57 and 59, respectively, and at their rear ends are suitably rigidly connected to vertical bars 21 and 22, respectively. A left brace bar 62 extends between the lower end of left rear vertical bar 57 and the rear end of left frame extension bar 60. A similar brace member 63 extends between the lower end of right rear vertical bar 59 and the rear end of right frame extension bar 61. These brace bars 62 and 63 are preferably welded in position.

Rotatably arranged about a horizontal transverse axis within the aforementioned box-like portion of subframe 32 is a reel represented generally by the numeral 64. This reel is shown as including a disc-like left end head 65 and a ring-like right end head 66. These end heads are connected together in a manner hereinafter described by a series of equally circumferentially spaced horizontal square bars 68 which severally extend longitudinally of the reel at the same radial distance from the axis of rotation of the reel. The right end of each bar 68 is provided with an outwardly extending horizontal cylindrical stud 69 the outer end portion of which is externally threaded. Each stud extends through a hole in right end head 66 and a nut 70 arranged on the threaded outer end of each stud bears against the outer end face of this end head, as shown in FIG. 7. The left end of each bar 68 is provided with a cylindrical neck 71 which extends through a hole in left end head 65. Welded to the end of each square bar at the base of its cylindrical neck is a U-shaped locking plate 72 which bears against the inside surface of left end head 65. The end portions of this locking plate have holes therein which register with corresponding holes in end head 65. Arranged in each pair of these registered holes is a machine screw 73 secured by a nut 74. In this manner the two end heads 65 and 66 are held together and each of the square bars 68 is non-rotatively mounted relative to the end heads.

Each of bars 68 is shown as carrying a plurality of laterally spaced cantilever-mounted tines or teeth 75. As shown, each of the bars 68 is provided with a plurality of radial through holes 76 in each of which the straight end portion of a tine 75 is arranged and secured against rotation and removal by a set screw 78 carried by the bar.

Figure 5:
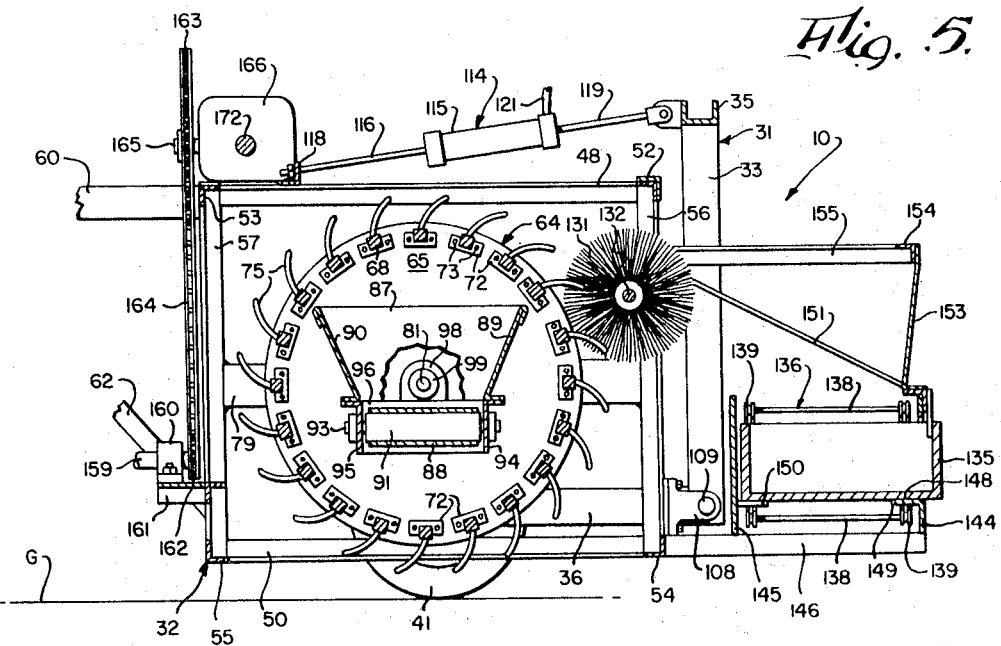
FIG. 5 is a fragmentary enlarged vertical longitudinal sectional view thereof taken generally on line 5—5 of FIG. 3.

As viewed in FIGS. 1 and 5, reel 64 rotates in a clockwise direction and the harvester also travels from left to right as viewed in these figures. The various tines or teeth 75 are curved insofar as that portion which is exposed outwardly beyond the periphery of end heads 65 and 66. These tines or teeth 75 are curved so that their free ends point generally in the direction of rotation of the reel.

The means for rotatively supporting reel 64 will now be described. Left front and rear subframe members 56 and 57 are shown intermediate their ends as rigidly connected to the ends of a horizontal intermediate channel bar 79 which carries a bearing 80 through which a horizontal shaft 81 extends. This shaft extends centrally through left reel end head 65 and is suitably rigidly connected thereto so that the reel and shaft rotate together. The outer end of shaft has fast thereto a drive sprocket 82.

Right reel end head 66 is supported by a pair of lower rollers 83 and a single upper roller 84, as shown in FIG. 6. These rollers engage the circular periphery of this end head. Upper roller 84 is suitably supported on a bracket 85 in turn suitably connected to right upper horizontal longitudinal subframe member 49. The axis of this upper roller lies in a vertical plane extending through the axis of horizontal shaft 81 for the reel. Lower rollers 83 extend in front of and behind this plane and are severally mounted on brackets 86 in turn suitably supported on right lower horizontal longitudinal subframe member 51.

Fruit collecting means are arranged within reel 64 to receive fruit picked by the tines 75. Such means are shown as comprising a trough-shaped structure including at its bottom a movable conveyor 88 and divergently inclined front and rear deflector walls 89 and 90, respectively, extending upwardly from opposite sides of the conveyor. An inclined cross wall 87 connects the left ends of deflector walls 89 and 90. As shown in FIG. 4, this conveyor is an endless belt which passes around a left idler roller 91 and a right drive roller 92. The horizontal shaft 93 for left roller which extends longitudinally of the harvester is shown as suitably journaled at its opposite ends on front and rear vertical transverse plates 94 and 95, respectively, which are suitably connected to the lower ends of deflector walls 89 and 90, respectively. These plates at their left end are connected by a cross vertical plate 96 having an upwardly extending arm 98 supporting a sleeve 99 which receives inner end portion of reel drive shaft 81. In this manner the left end of the U-shaped structure constituted by the plates 94–96 is hung from the inner end of shaft 81. A shaft 97 for drive roller 92 is also suitably journaled on plates 94 and 95.

Transverse plates 94 and 95 are shown as having angle bar extensions 100 and 101, respectively, which at their other ends are connected to the upper ends of front and rear angle bar legs 102 and 103, respectively. The upper ends of these legs are joined by a horizontal angle bar 104. The lower ends of these legs are secured to and supported by an outer longitudinal angle bar 105. Front lower transverse bar 54 is extended rightwardly to be joined suitably to the front end of bar 105 and this juncture is connected by an angle bar brace 106 to upper right longitudinal bar 49 at its juncture with front right vertical bar 58. The rear end of outer horizontal bar 105 is suitably rigidly connected to a rightward extension of the rear horizontal transverse bar 55.

Reel 64 is vertically adjustable with respect to wheeled main frame 31, accomplished by pivoting the front lower corners of subframe 32 on main frame 31. For this purpose, left front vertical bar 56 adjacent its lower end carries a bracket 108 in turn supporting a horizontal left pivot pin 109 which is received in a bushed hole 110 provided in left vertical bar 33 of the main frame. Coaxial with this pivot pin is a right pivot pin 111 supported by a bracket 112 mounted on subframe 31 at the juncture of brace 106 with the outer longitudinal bar 105. This right pivot pin is received in a bushed hole 113 in right vertical bar 34 of the main frame.

The rear portion of subframe 32 can be raised or lowered vertically essentially by pivotal action about the axes of coaxial pivot pins 109 and 111. For this purpose, a hydraulic actuator 114 is operatively interposed between the main frame and subframe. As shown, this actuator includes a cylinder 115 connected by rod 116 to a transverse angle bar 118 secured to the upper longitudinal subframe bars 48 and 49, and also includes a piston rod 119 which is secured to horizontal transverse bar 35 of the main frame. Preferably a hand operated hydraulic pump 120 arranged within the reach of the operator when occupying seat 28 controls the flow of hydraulic fluid through a line 121 to cylinder 115 and thereby controls the effective length of the actuator 114 and hence the vertical position of the subframe relative to the main frame. Normally the adjustment is such that the free ends of the tines 75 come within an inch or two of the ground over which the harvester is moved during a harvesting operation.

The right end of conveyor 88 extends outwardly beyond the right end head 66 of reel 64 and discharges collected material onto the lower end of the upper reach of an elevator conveyor 122 which extends generally fore and aft of the machine at the right side thereof and inclines upwardly and rearwardly. This conveyor 122 is preferably a cleated endless belt which extends around a front idler roller 123 having a shaft 124 and also passes around a rear drive roller 117 having a shaft 125. The axes of these shafts 124 and 125 are horizontal and transverse to the line of travel of the harvester. These shafts 124 and 125 are journalled suitably on an inner vertical plate 126 and an outer vertical plate 128, these plates extending longitudinally of the machine and inclining upwardly and rearwardly slightly. Inner plate 126 is suitably secured to bars 51 and 59, and outer plate 128 to bars 102 and 103, as by welding. Near its rear end plate 128 is also supported by vertical strut bars 127 carried by bar 55. The front end of conveyor 122 is disposed under the right discharge end of transverse conveyor 88.

Arranged under the elevated rear end of conveyor 122 is a lug box or receptacle 129 which receives harvested fruit. This receptacle is supported on a pair of arms 130 extending rearwardly from and rigidly connected to the longitudinal subframe bars 51 and 105 on the right side of the machine.

Arranged to rotate about a horizontal transverse axis adjacent reel 64 at the upper front quadrant thereof is a cylindrical brush 131. This brush has bristles extending radially outwardly about the entire circumference from a core or shaft 132. This shaft is journalled at its left end in a bearing 133 supported on left front vertical bar 56, and its right end is journalled in a bearing 134 suitably supported on the corresponding right bar 58. The bristles of rotatable brush 131 overlap the tines 75 as they pass through the brush so that rotation of the brush relative to the tines tends to clean debris from between adjacent tines that may have become clogged there. As viewed in FIG. 5 or from the right side of the machine, brush 131 is rotated in a counterclockwise direction, whereas reel 64 is rotated in a clockwise direction.

Supplemental fruit collecting means arranged forward of the reel 64 and brush 131 are provided to receive debris in which fruit may be entrapped swept from the reel by the brush. Such means are shown as comprising a tray or receptacle 135, arranged in front of main frame 31 although supported on subframe 32, and further arranged between the horizontal upper and lower reaches of an endless rod conveyor 136 extending transversely of the machine. This conveyor is shown as comprising a multiplicity of laterally spaced rods 138 the ends of which are suitably mounted on endless chain-like supports 139 which pass around a drive wheel 140 at the right end of the machine and an idler wheel 141 at the left end of the machine. The shafts 142 and 143, respectively, of these wheels are shown as being journalled at their ends in a front transverse vertical plate 144 and a rear transverse vertical plate 145, these plates upstanding from forwardly projecting horizontal arms 146 which are suitably connected to and form part of subframe 32. Specifically, the rear ends of these arms are shown in FIG. 5 as being suitably joined to the lower front transverse bar 54. Front plate 144 is shown as having an opening 148 therein through which receptacle 135 can be inserted and removed. This receptacle is shown as supported on an inturned flange 149 at the bottom of opening 148 in front plate 144 and the inner end of the box is shown as supported on a flange 150 extending forwardly from and suitably secured to rear plate 145. Adjacent each end front plate 144 is braced by left and right metal straps 151 and 152, respectively, extending downwardly and forwardly from vertical subframe bars 56 and 58, respectively. A flexible deflector curtain 153 of canvas or the like hangs from a horizontal transverse angle bar 154 arranged above front plate 144 and is supported at its ends by left and right horizontal longitudinal angle bars 155 and 156, respectively. These bars 155 and 156 project forwardly from vertical subframe bars 56 and 58, respectively, and are suitably secured thereto.

The means for driving the various movable parts will now be described, principally in connection with the schematic illustration of the drive mechanism shown in FIG. 9.

Power take-off shaft 18 is universally coupled to one end of a drive shaft 158 which at its other end is universally coupled to a horizontal longitudinal driven shaft 159 journalled in a bearing 160 supported by a bracket 161 suitably fixed to subframe 32. The front end of shaft 159 has fast thereto a sprocket 162 in vertical coplanar arrangement with an overhead larger sprocket 163, a chain 164 passing around these sprockets. Sprocket 163 is fast to the rear end of a horizontal longitudinal shaft 165 extending rearwardly from a gear box 166 suitably supported on and secured to the top of subframe 32.

A left horizontal transverse shaft 168 extends from gear box 166, being journalled adjacent its outer end in a bearing 169 mounted on upper left subframe bar 48. A relatively small sprocket 170 is fast to the outer end of shaft 168 and is in vertical coplanar arrangement with sprocket 82 which drives reel 64, a chain 171 passing around these sprockets.

A right horizontal transverse shaft 172 extends from gear box 166, being journalled adjacent its outer end in a bearing 173 mounted on upper right subframe bar 49. Inwardly of this bearing, shaft 172 has fast thereto a sprocket 174 which is in vertical coplanar arrangement with a lower sprocket 175 fast to the inner or left end of shaft 125 for drive roller 117 for elevator conveyor 122, a chain 176 passing around these sprockets.

Outwardly of bearing 173, shaft 172 has fast thereto a sprocket 178 which is in vertical coplanar arrangement with a sprocket 179 fast to the right end of shaft 132 for brush 131 and also with a sprocket 180 fast to the outer or left end of a horizontal transverse shaft 181, a chain 182 passing around these three sprockets. Shaft 181 extends from a gear box 183 which is mounted on a bracket 184 suitably secured to right front subframe bar 58, brace bar 106 and an auxiliary brace bar 185 extending between bracket 184 and lower subframe bar 105.

A horizontal longitudinal shaft 186 extends rearwardly from gear box 183 and has front and rear sprockets 188 and 189, respectively, fast thereto. Front sprocket 188 is in vertical coplanar arrangement with a lower sprocket 190 fast to the rear end of shaft 142 for drive wheel 140 for screen conveyor 136, a chain 191 passing around these sprockets 188 and 190. Rear sprocket 189 is in vertical coplanar arrangement with a lower sprocket 192 fast to the front end of shaft 97 for drive roller 92 for transverse conveyor 88 inside reel 64, chain 193 passing aound these sprockets.

As viewed from the rear of the machine, horizontal longitudinal shafts 159, 165, 97, 142 and 186 rotate in a clockwise direction. As viewed from the right side of the machine, horizontal transverse shafts 168 and 81 rotate in a clockwise direction, whereas horizontal transverse shafts 125, 132, 172 and 181 rotate in a counterclockwise direction. The various directions for these shafts and their sprockets are illustrated by arrows in FIG. 9.

Operation

The operator sits in the seat 28 while manipulating the steering wheel 26 to steer the harvester over the low plants intended to be harvested. By manipulating pump 120 the operator adjusts the level of the subframe 32 relative to the main frame 31 such that the free ends of the tines 75 of the reel 64 as they pass through their lowermost point are one or two inches above the ground.

A feature of the inventive harvester is that the forward speed of the harvester in the direction of travel D is adjusted by the operator's control of the engine throttle such that in the lower front quadrant of the reel there is a dead point at which the rearwardly directed horizontal velocity component of the tines 75 at such dead point substantially equals the forward speed of the harvester. At this position the tines extend generally vertically downwardly and thereby enter the plant without any substantial forward movement. In this manner the tines can get into picking position inside the plants as they begin to turn to point in a rearward direction without excessive disturbance of the plant foliage. The spacing between adjacent tines in a given row is less than the transverse dimension of most of the fruit to be picked so that the fruit after being picked will be retained on the upper side of the ascending tines. As the reel rotates the picked fruit substantially remains on the tines and is elevated as the rear side of the reel ascends, being caught in the crotch between a rising square bar 68 and the base of the tines 75 supported thereby. As the picked fruit is elevated by the reel it is dumped onto conveyor 88 between deflector walls 89 and 90.

While some foliage, stems and straw and the like get lodged in the spaces between the tines 75 as they comb or rake the foliage, on the descending forward side of the reel 64 after the fruit has been dumped, the rotating brush 131 cleans the spaces between the tines, throwing the debris forwardly onto the top of screen conveyor 136. The straw and foliage is in the main carried by this conveyor to the right side of the machine and dumped onto the ground while any articles of fruit entrapped in the swept debris are freed and fall by gravity into receptacle 135. When this receptacle becomes sufficiently filled, it is removed and replaced with another empty receptacle.

The fruit dumped by reel 64 onto conveyor 88 within the reel is conducted by the upper reach of this conveyor to the right side of the machine and dumped onto the lower end of the elevator conveyor 122. The upper reach of this conveyor 122 carries the fruit rearwardly and dumps it into receptacle 129. When this receptacle becomes sufficiently filled, it is replaced with an empty one.

It has been found that the machine described above when used to pick lowbush blueberries has a picking rate equivalent to the sum of from seven to ten hand pickers.

While the inventive machine has been described in application to the harvesting of lowbush blueberries, it is applicable also to harvesting fruit on other relatively low plants such as strawberries or pickles.

What is claimed is:

1. In a machine for harvesting fruit on relatively low plants such as lowbush blueberries, the improvement which comprises a frame movable over the plants in a direction of travel including a wheeled main frame and a subframe vertically adjustably mounted on said main frame, a reel mounted on said subframe for rotation about an axis transverse to said direction of travel including spaced end members, circumferentially spaced bars extending between said end members and laterally spaced curved tines cantilever-mounted on said bars arranged with their free ends pointing generally in the direction of rotation of said reel so as to comb the plants and remove the fruit therefrom, and means for rotating said reel in a direction such that the leading side of said reel descends as said frace moves in said direction of travel, the rotational speed of said reel and the forward speed of said frame in said direction of travel being such that in the lower front quadrant of said reel there is a dead point at which the rearwardly directed horizontal velocity component of said tines at said point substantially equals said forward speed.

2. In a machine for harvesting fruit on relatively low plants such as lowbush blueberries, the improvement which comprises a frame movable over the plants in a direction of travel including a wheeled main frame and a subframe vertically adjustably mounted on said main frame, a reel mounted on said subframe for rotation about an axis transverse to said direction of travel including spaced end members, circumferentially spaced bars extending between said end members and laterally spaced curved tines cantilever-mounted on said bars arranged with their free ends pointing generally in the direction of rotation of said reel so as to comb the plants and remove the fruit therefrom, means for rotating said reel in a direction such that the leading side of said reel descends as said frame moves in said direction of travel, fruit collecting means arranged within said reel to receive picked fruit dumped by said tines, and brush means arranged to sweep debris from between said tines.

3. A machine according to claim 2 wherein said brush means are arranged outwardly and longitudinally of said reel and adjacent the upper front quadrant thereof, and further comprising supplemental fruit collecting means arranged forward of said reel to receive debris swept from said reel by said brush means.

4. A machine according to claim 3 wherein said supplemental fruit collecting means includes a receptacle and a driven screen conveyor having a reach extending over said receptacle and movable in a direction transverse to said direction of travel, whereby such swept debris may be deposited on said reach and picked fruit entrapped in said swept debris may be separated therefrom and gravitate into said receptacle.

References Cited

UNITED STATES PATENTS

| | | | |
|---|---|---|---|
| 1,622,117 | 3/1927 | Jenkins | 56—330 |
| 2,230,523 | 2/1941 | Byhre | 171—92 |
| 2,267,879 | 12/1941 | Tillitt | 171—92 |
| 2,924,283 | 2/1960 | Macphee | 171—61 |
| 3,165,876 | 1/1965 | Towson | 56—130 |

ANTONIO F. GUIDA, Primary Examiner